R. S. GANS.
LOADING INDICATOR FOR VEHICLES.
APPLICATION FILED AUG. 14, 1919.
1,355,392.
Patented Oct. 12, 1920.
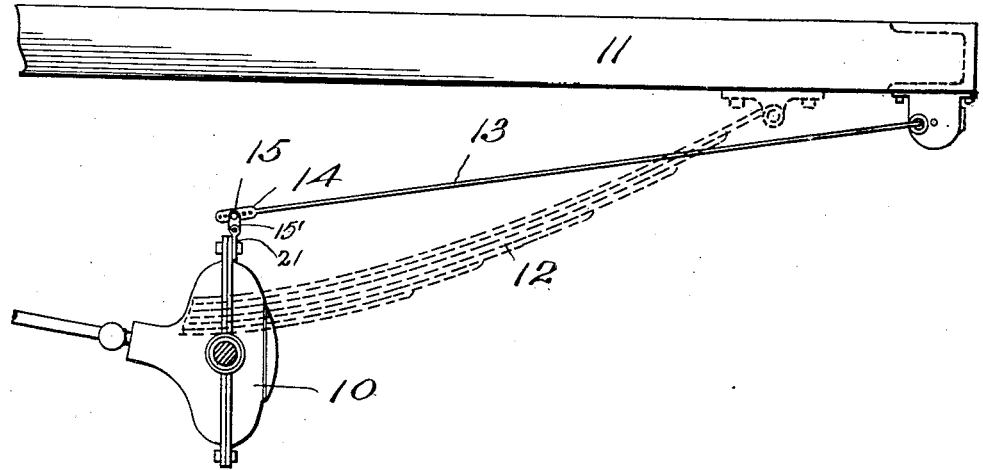
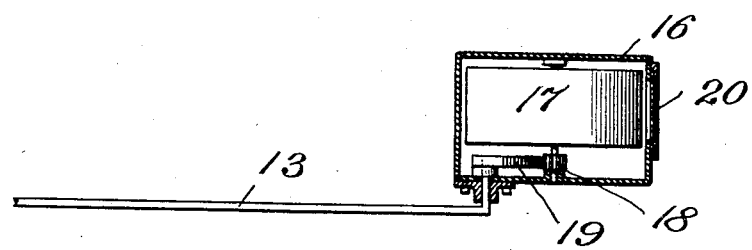
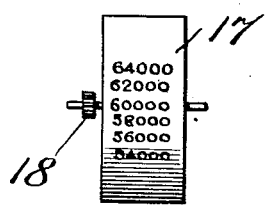
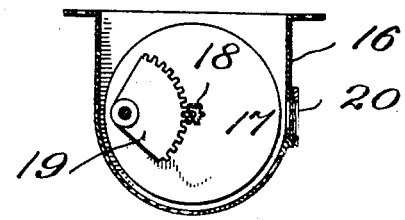
Robert S. Gans
Inventor
By his Attorney

UNITED STATES PATENT OFFICE.

ROBERT S. GANS, OF NEW YORK, N. Y.

LOADING-INDICATOR FOR VEHICLES.

1,355,392.　　　　Specification of Letters Patent.　　Patented Oct. 12, 1920.

Application filed August 14, 1919. Serial No. 317,422.

*To all whom it may concern:*

Be it known that I, ROBERT S. GANS, a citizen of the United States, residing at New York, in the county and State of New York, have invented certain new and useful Improvements in Loading-Indicators for Vehicles; and I do hereby declare the following to be a full, clear, and exact description of the invention, such as will enable others skilled in the art to which it appertains to make and use the same.

My present invention relates to a simple and inexpensive apparatus for indicating the degree of loading of a vehicle of any kind, and particularly of trucks, whether motor driven or otherwise. My improvement is particularly adapted for ready application to trucks and other vehicles by the means of simple tools and without requiring any special mechanical skill. The device is of such a nature that it cannot easily get out of order and requires only the most ordinary intelligence in the person using it or putting it in place upon a vehicle.

Where trucks are used to carry miscellaneous loads, loading by guess work is sure to involve waste. If a truck be underloaded its use involves a waste of time with consequent loss of profit. If it be overloaded there is undue wear and tear and a certain danger of disaster. It is therefore desirable to provide means whereby the driver or truckman may be able easily to ascertain when the proper load has been placed upon his vehicle, so that he may avoid either underloading or overloading the same.

Various plans have been suggested for this purpose, and it is the principal object of the present invention to provide means for carrying out the above named ends which shall be cheaper, simpler, and less liable to get out of order than the devices hitherto proposed.

I have illustrated one embodiment of my invention in the accompanying drawings, wherein Figure 1 is a side elevation of the device and of enough of an automobile to make the invention clear, Fig. 2 is a top view of the indicator, the casing being shown in horizontal section, Fig. 3 is a side view of the same with one wall of the casing removed, and Fig. 4 is an elevation of the indicating drum.

In the particular form of my invention shown in the drawings, the housing of the rear or driving axle of an automobile is shown at 10, and the springs whereby the side bars 11 of the vehicle body are connected with this axle are indicated in dotted lines at 12. As the load upon the vehicle is increased these springs will yield, and the side bars 11 will approach the housing 10. In carrying out my present invention, I convert this relative vertical movement into a swinging or angular movement in the vertical plane, and provide a simple means whereby the degree of this swinging may be indicated with a sufficiently close approximation.

In the form shown, I employ a light rod 13, one end of which is attached in any convenient manner to the housing 10, for instance, by providing rod 13 with a flattened end portion 14 having a number of holes therethrough, adapted to receive a pin 15. The latter is secured to a link 15' which is pivotally connected at its lower end to a strap 21 secured to the housing 10. This arrangement affords a simple means for accommodating a given apparatus to different vehicles.

The opposite end of the rod 13 is suitably connected with any convenient form of indicator on the vehicle body, adapted to measure the degree of vertical swing imparted to the rod 13 by relative movement between such body and the housing. It is best to employ some form of multiplying indicator in this connection, and I prefer the form shown in detail in Figs. 2 to 4, and constructed as follows.

Within a suitable casing 16 fixed to the lowest point of the vehicle, preferably on the center line of the same, there is mounted a revoluble drum or disk 17, upon the shaft of which is fixed a small pinion 18. A toothed sector 19 is mounted within the casing 16 upon a revoluble shaft to which is fixed the end of the swinging rod 13. This sector 19 is in mesh with the pinion 18, and as the sector has a diameter considerably greater than that of the pinion, there will be imparted to the drum or disk 17 an angular movement proportionately greater than that imparted to the sector by the rod 13.

In the operation of the device, relative vertical movement between the vehicle body and housing 10 results in oscillation of rod 13 about the axis of sector 19 as a center, the opposite end of the rod describing a vertical arc, the divergence of which from a vertical straight line is permitted by the link connection 15'. The oscillation of the axis of sector 19 thus produced gives the desired partial rotation to sector 19.

As shown in Fig. 4, the drum 17 bears numerals or other suitable indicating marks upon its periphery, and, when the drum is revolved, these marks move behind the window 20 in the casing 16, through which they can be observed, thereby furnishing an indication of the degree of loading of the vehicle.

As shown in the drawings, the indicator and swinging rod are so arranged that they can be readily and quickly applied to any vehicle without the exercise of any special skill.

Various changes can be made in this device without departing from my invention and I do not limit myself to the details herein shown and described.

What I claim is:

1. In a loading indicator, the combination with the frame and axle of a spring-supported vehicle, of an indicator attached to the frame and adapted to indicate weight, and a swinging rod mounted at a considerable angle to the vertical and connected at its opposite ends to the axle and indicator, the connections being such that movement of said indicator will be proportional to the extent of angular movement of said rod during relative vertical movement between said frame and axle.

2. In a loading indicator, the combination with the frame and axle of a spring-supported vehicle, of an indicator attached to the frame and adapted to indicate weight, and a swinging rod connected at one end with the axle and at the other end with said indicator, said rod being arranged to oscillate about its connection with said indicator as a center during relative vertical movement between the frame and axle, and by such oscillation to operatively move said indicator.

3. In a loading indicator, the combination with the frame and axle of a spring-supported vehicle, of an indicator attached to the frame and adapted to indicate weight, and having a rotatable shaft movable in a vertical plane with said frame, and a swinging rod connected at one end with said shaft and at the other with said axle, and so arranged as to oscillate said shaft as the frame and axle move relatively to each other.

4. In a loading indicator, the combination with the frame and axle of a spring-supported vehicle, of an indicator attached to the frame and comprising a revoluble member, a swinging rod connected at one end with the axle, and multiplying connections between the other end of said rod and said revoluble member, said connections adapted to swing said member through an arc greater than, but proportional to, the arc through which said rod swings, during relative vertical movement between the axle and frame.

5. In a loading indicator, the combination with the frame and axle of a spring-supported vehicle, of an indicator attached to the frame and comprising a casing secured to the frame, a revoluble indicating drum therein, and gear members for rotating said drum, and a swinging rod connected at one end with the axle and at the other end with one of said gear members.

6. In a loading indicator, the combination with the frame and axle of a spring-supported vehicle, of an indicator attached to the frame and adapted to indicate weight, and a swinging rod mounted at a considerable angle to the vertical and connected at its opposite ends to the axle and indicator, the connections being such that movement of said indicator will be proportional to the extent of angular movement of said rod during relative vertical movement between said frame and axle, the connections between said rod and axle comprising a pin and a part provided with a series of openings into any one of which said pin may be inserted, to permit the effective length of said rod to be increased or decreased.

In testimony whereof I affix my signature.

ROBERT S. GANS.